United States Patent
Jin et al.

(10) Patent No.: US 9,256,065 B1
(45) Date of Patent: Feb. 9, 2016

(54) SYSTEM AND METHOD FOR COMPENSATING THERMAL DEPENDENT LOSS IN VARIABLE OPTICAL ATTENUATORS

(71) Applicants: Guanghai Jin, Chelmsford, MA (US); Luzhong Yin, Andover, MA (US)

(72) Inventors: Guanghai Jin, Chelmsford, MA (US); Luzhong Yin, Andover, MA (US)

(73) Assignee: Agiltron, Inc., Woburn, MA (US)

( * ) Notice: Subject to any disclaimer, the term of this patent is extended or adjusted under 35 U.S.C. 154(b) by 0 days.

(21) Appl. No.: 14/529,602

(22) Filed: Oct. 31, 2014

(51) Int. Cl.
*G02B 26/02* (2006.01)
*G02B 1/00* (2006.01)
*G02B 1/02* (2006.01)
*H01C 7/04* (2006.01)

(52) U.S. Cl.
CPC ............... *G02B 26/023* (2013.01); *G02B 1/00* (2013.01); *G02B 1/02* (2013.01); *H01C 7/04* (2013.01)

(58) Field of Classification Search
USPC ............................................ 359/230; 385/140
See application file for complete search history.

(56) References Cited

U.S. PATENT DOCUMENTS

| 7,007,471 B2 * | 3/2006 | Sinclair | B81B 3/0024 |
| | | | 310/307 |
| 2011/0217018 A1 * | 9/2011 | He | B23P 11/00 |
| | | | 385/140 |

* cited by examiner

*Primary Examiner* — James Phan
(74) *Attorney, Agent, or Firm* — Burns & Levinson LLP; Orlando Lopez

(57) ABSTRACT

A system having a MEMS variable optical attenuator (VOA) that has an improved optical shutter for regulating the optical power of an optical signal by partially intercepting incident light beams and a negative temperature coefficient component that is electrical connected in series with a voltage source that drives the MEMS variable optical attenuator (VOA) is disclosed.

19 Claims, 10 Drawing Sheets

SYSTEM AND METHOD FOR COMPENSATING THERMAL DEPENDENT LOSS IN VARIABLE OPTICAL ATTENUATORS

BACKGROUND

A variable optical attenuator (VOA) is an electro-optical component capable of attenuating an optical power by a varied amount of attenuation based on a user's requirements by applying an electrical control signal. Variable optical attenuators are widely used to control or regulate optical power levels in optical telecommunication systems. For example, an optical attenuator is needed in optical telecommunication network laser sources to regulate an output optical power. In an other example, an optical attenuator is needed in laser detector when an optical signal with an excessive power level, that is, greater than a predetermined power level, is received. In a further example, an optical attenuator is needed to balance the optical power level among multiple channels in the EDFA (Erbium-Doped Fiber Amplifier) module.

Variable optical attenuators have been produced by various methods, including electro-optical polarization rotation, waveguide index change, bulk mechanical and micro mechanical light beam blocking or steering. Among MEMS VOAs, electro-static based devices are a most common approach. However, their need for a high electrical field to generate sufficient actuation force results in the requirement of costly hermetic packaging. Electro-thermal actuation is also used in VOAs. Nevertheless, these devices are large in size, the response time for thermal structures is relatively slow, and the device's thermal, control is a significant challenge for the packaging design. Previous designs that use electro-magnetic force have eliminated the need for the expensive hermetic packaging, but they need external magnets. Also, VOAs made by these designs are subject to drift of both time and background temperature dependence which prevents them to be used in general applications.

Because the attenuation of the optical signal is highly sensitive to the position of the beam blocking or steering mechanism, any change of the device characteristics with time and background temperature, for example, material Young's modulus, resistance, thermal expansion mismatch between different layers, will introduce drift to the attenuation signal. Further the conventional MEMS variable optical attenuators have a substantial disadvantage of signal drift and undesirably large size.

An improved MEMS VOA design is disclosed in U.S. Pat. No. 8,666,218, which is incorporated by reference herein in its entirety and for all purposes. However, for a compact thermal actuated VOA, for example, one using highly doped silicon, during the thermal equilibrium procedure of the device itself or environmental temperature change, the drift could be more than 1 dB. The increased resistance leads to a decreased input power to the actuator when the input voltage holds constant. This leads to lack of usefulness of the device, and increase cost of the fabrication.

Therefore, the market needs system and methods for thermal compensation of an improved MEMS VOA design.

BRIEF SUMMARY

The present teachings overcome the above problems by providing an optical attenuator that uses an element of a micro-electro-mechanical system (MEMS) device, and more particularly a MEMS variable optical attenuator (VOA) chip having an improved optical shutter for regulating the optical power of an optical signal by partially intercepting incident light beams, where a negative temperature coefficient component is electrical connected in series with a voltage source that drives the MEMS variable optical attenuator (VOA).

In accordance with one embodiment of the present teachings, the above and other provisions are accomplished by a MEMS variable optical attenuator comprising a frame having a planar surface, a micro-electric actuator that drives an optical shutter movable to block partially or totally light beam transmitting from sources of electromagnetic radiation such as, but not limited to, optical fibers, where a negative temperature coefficient component is electrical connected in series with a voltage source that drives the MEMS variable optical attenuator (VOA).

The actuator includes at least two electrodes fixed onto the substrate, a group of movable conductors (hereinafter referred to as wires) anchored to these electrodes, and the optical shutter attached to the movable wires. Therefore, when a driving current passes through the movable wires, the optical shutter will gradually cover the light path.

The movable wires may have, but are not limited to, the same dimensions, resistance, and initial angle. The substrate may also be made of same material as the wires and is fixed onto the surface having the input/output, optical port (for example, optical fiber pigtail surface). In one embodiment, when the wires are heated up by the driving current, the temperature difference between the wire and the substrate generates a stress that causes a portion of the wire to move along a defined direction. The optimized small size and light mass helps the chip to establish a temperature gradient in short time. The environmental temperature changes add the same influence to the wires and the substrate so that there is substantially no temperature difference. As a result, the structure compensates in all dimensions, leading to effectively unchanged shutter position.

Embodiments of the method of use and other embodiments are presented herein below.

For a better understanding of the present teachings, together with other and further needs thereof, reference is made to the accompanying drawings and detailed description and its scope will be pointed out in the appended claims.

BRIEF DESCRIPTION OF THE DRAWINGS

FIG. 1b illustrates another view of the embodiment of FIG. 1a;

FIGS. 2a, 2b illustrate details of the embodiments of the MEMS VOA of FIG. 1a;

DETAILED DESCRIPTION

The following detailed description is not to be taken in a limiting sense, but is made merely for the purpose of illustrating the general principles of these teachings, since the scope of these teachings is best defined by the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

A detailed description of a MEMS variable optical attenuator (VOA) in accordance with various embodiments of the present invention will be given below with reference to the accompanying drawings.

Figure 1A:
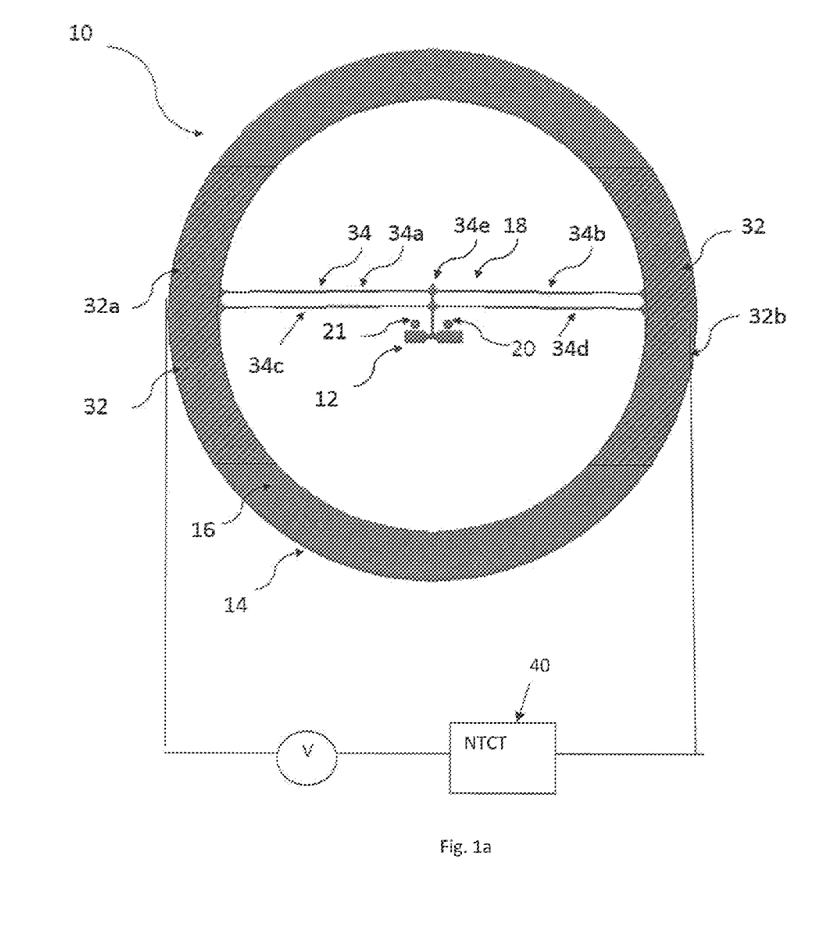
FIG. 1a is illustrates an embodiment of a MEMS VOA chip of these teachings.

FIG. 1a illustrates a schematic view of an embodiment of a MEMS variable optical attenuator 10 in which an optical shutter 12 is utilized in accordance with one embodiment of these teachings.

Figure 1B:
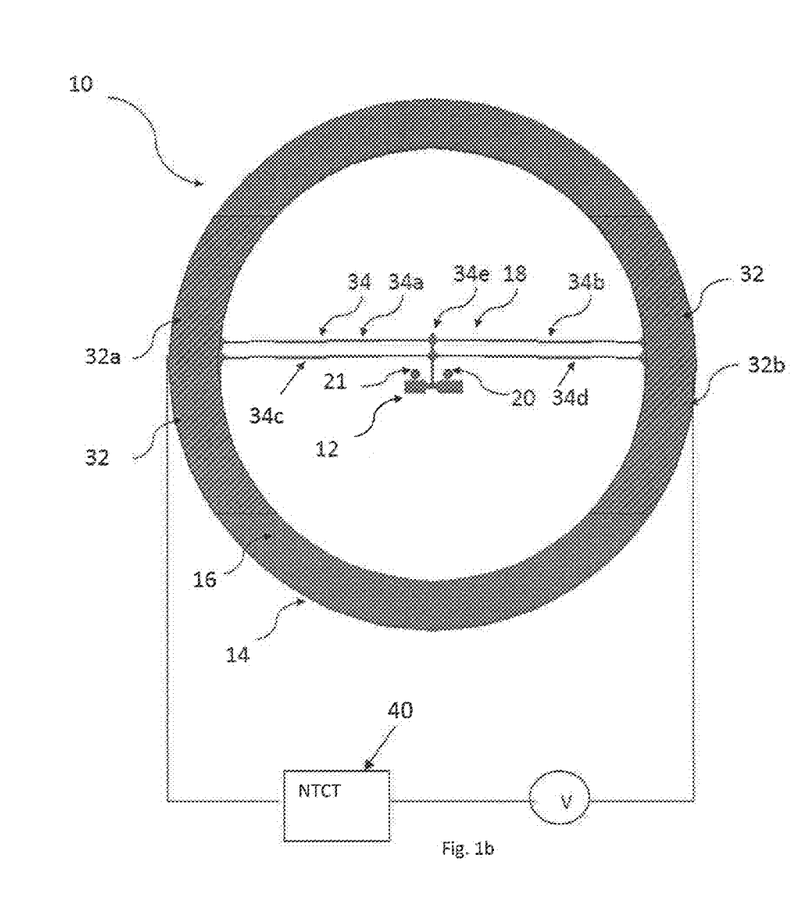
Figure 1C:
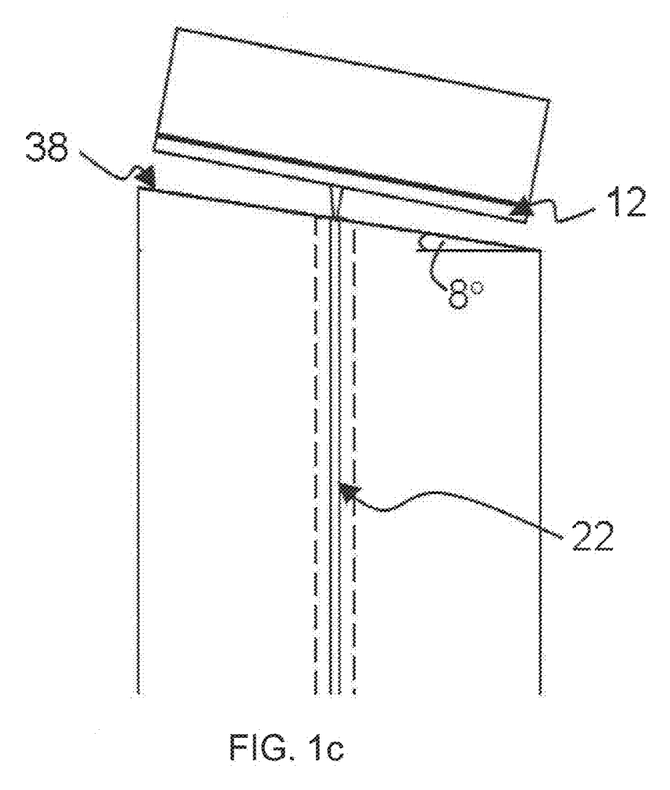
FIG. 1c illustrates a view of another instance of the embodiment of FIG. 1a in which the optical emitting/receiving surface is angled.

More specifically, the MEMS variable optical attenuator (VOA) or VOA chip 10 includes a substrate 14 (embodiments in which the VOA chip is lifted from the substrate are also within the scope of these teachings) having a planar surface frame 16, a micro-electric actuator 18 arranged on the planar surface 16 of the substrate 14, and optically aligned with each other while being arranged against the planar surface 16, an optical shutter 12 movable to a predetermined position over the receiving optical port 20 or the transmitting optical port 21 (in one instance, as shown in FIG. 1c, the optical ports 20, 21 connect to optical fibers 22) by the micro-electric actuator 18, thereby attenuating the partially transmitted light beams emanating/incoming from/to the optical ports 20, 21. It should be noted that the wires 34 shown in FIG. 1a are comprised of wire segments 34a, 34b (for the first wire), 34c, 34d (for the second wire). Connector (wire) segments 34a and 34b (for the first connector) are connected at one end (at a location) 34e; similarly, connector segments 34c and 34d (for the second connector) are also attached at one end. The optical shutter 12 is operatively attached to the first and second connector segments at the location where the first and second, connector segments are connected (attached); similarly, the optical shutter is operatively attached to the connector segments for the second connector at the location where the connector segments for the second connector are connected.

The optical shutter 12 may have, but is not limited to, a flat panel shape and is arranged to be opaque relative to the transmitting port 21 and/or the receiving port 20 end.

Figure 2A:
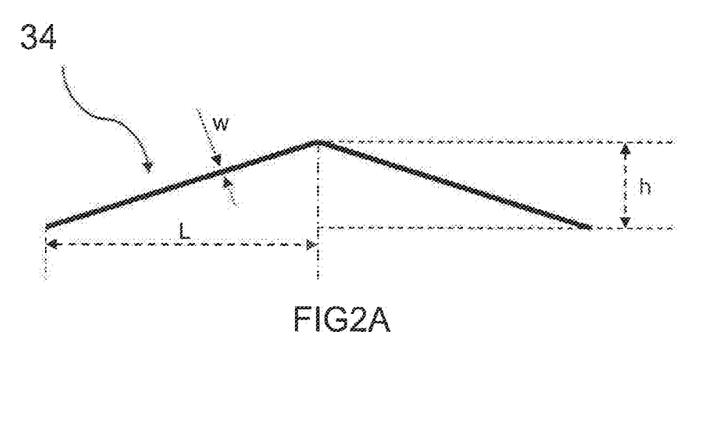
Figure 2B:
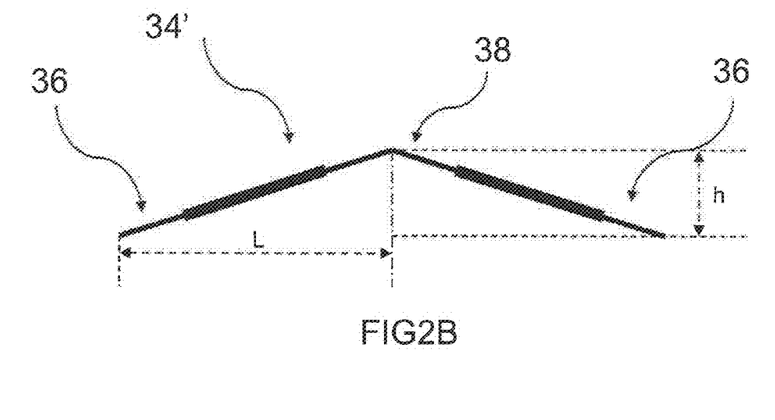

The actuator 18 includes at least two electrodes 32a, 32b fixed onto the substrate 14 and a group of movable wires 34 anchored to the electrodes 32a, 32b, and the optical shutter 12 is attached to the movable wires 34. It should be noted that a first end of the first wire segment 34a is fixedly attached to the first electrode 32a and a first end of the second wire segment 34b is fixedly attached to the second electrode 32b. The first wire segment 34a and the second wire segment 34b are disposed at an angle from a line connecting the first electrode 32a to the second electrode 32b, as shown in FIG. 2a. The first wire segment 34a and the second wire segment 34b are the two sides of a triangle. A second end of the first wire segment 34a is connected to a second end of the second wire segment 34b. Except at the point of connection to the electrodes, the first and second wire segments are moveable. The third and fourth wire segments 34c, 34d are arranged in the same manner and are disposed substantially parallel to the first and second wire segments 34a, 34b, (Since the angle at which the wire segments are disposed is very small, the angle can not be seen in FIG. 1a. However, a not to scale view is shown in FIGS. 2a, 2b, where the angle is explicitly shown.) Therefore, when a driving current passes through the movable wires 34, the optical shutter 12 will gradually cover the light path.

Figure 2C:
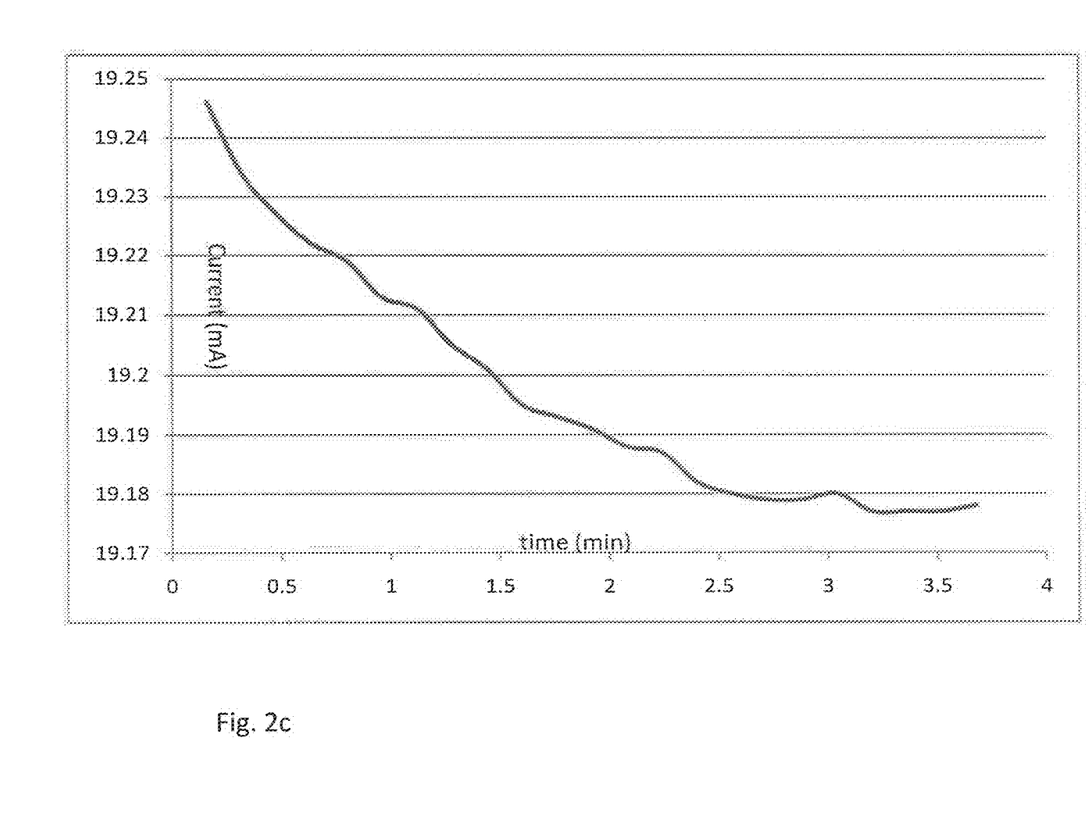
FIG. 2c graphically illustrates the electrical current change after a step voltage input to one embodiment of the MEMS VOA of these teachings.

In one embodiment, the movable wires 34a, 34b (and/or 34c, 34d) have, but are not limited to, the same dimensions, resistance, and initial angle. The substrate 14 may also be made of the same material as the wires 34 and is fixed onto a surface having input/output optical ports 20, 21 (see FIG. 1c). In one instance, not a limitation of these teachings, the input/output optical ports include, for example, an optical fiber pigtail surface. Therefore, when the wires 34a, 34b, 34c, 34d are heated by the driving current, the temperature difference between the wires 34 and the substrate 14 generates a stress that causes the wires 34 to move along a defined direction, as shown in FIG. 2c.

As shown in FIG. 1a, the movable wire group has multiple semiconductor wires 34. In one embodiment, all the wires 34 have substantially the same cross-section and length. (In one instance, as is shown FIGS. 7a-7e, the conductors and the planar surface are etched from the planar substrate so that the thermal expansion of the wires and the planar surface are substantially the same.) The wires 34 are electrically conductive so that they heat up upon applying a current.

In one instance, electric-thermal expansion induced motion amplification is achieved by using etched wires with an initial angle.

In one embodiment, a layer of a reflective or refractive material is deposited on one or more surfaces of the optical shutter 12. In one instance, the reflective or refractive material includes one or more materials such as Ti, Cr, Au, Pt, or glass.

In one instance, the optical shutter 12 is disposed between an optical receiving port and an optical emitting (transmitting) port. In that instance, in one embodiment, the reflective or refractive material is deposited on both the surface of the optical shutter facing the optical receiving port and the surface facing the optical emitting port.

In one embodiment, the wires 34 are formed from a material, such as doped silicon, selected to substantially optimize the required driving voltage (the voltage across the electrodes 32a and 32b) for the VOA.

In one instance, as shown in FIG. 1c, the optical system having the receiving/emitting optical ports has an angled faceted end 38. In the embodiment shown in FIG. 1c, the optical shutter 12 is disposed substantially parallel to the angled faceted end 38 and is located obliquely (at an angle) with respect to an optical path axis of the electromagnetic radiation emitted/received from the emitting/receiving optical ports.

For such initial angled wires 34, as shown in FIG. 2a, the displacement under small deformation condition is given as $$d = \frac{h\alpha TL^2}{h^2 + W^2} \tag{1}$$

where h is the angle height and W is width of the wire, L is half of the base length of wire 34, $\alpha$ is the thermal expansion coefficient of the wire 34 and T is the temperature increment on the wire 34. As can be seen from the above equation, the displacement has a maximum value of $\alpha TL^2/2W$ at h=W. When h=0, the amplifier displacement d will disappear. A small width of the wires 34 leads to large maximum displacement according to equation (1). In the embodiment in which the wires 34 have a substantially constant width W and the height of the triangle h is substantially equal to the width W, a substantially maximum displacement d of the point at which the wire segments 34a, 34b are connected is obtained.

Another shape of wire 34' is shown in FIG. 2b, where the wire 34' has a narrower width at the feet 36 and center 38 of the wires 34'. Such layout will decrease the effective width of the wire 34' while increase stiffness of the wire 34'. When the wires 34 or 34' are heated up by electric current, the thermal expansion drives the wires to bend in the defined direction according to Eqn. (1). The multi-wire structure shown in FIG. 1a restricts the movement, in a plane. In one instance, to obtain substantially maximum displacement, due to symmetry, the shutter movement is substantially in the light blocking dimension.

For the compact thermal actuated VOA of FIG. 1a, for example, in embodiments using highly doped silicon, during the thermal equilibrium procedure of the device itself or environmental, temperature change, the drift could be more than 1 dB. The increased resistance leads to a decreased input power to the actuator when the input voltage holds constant. The increased resistance can be at least partially corrected by a negative temperature coefficient component 40 configured to be electrically connected in series with the voltage source, V, as shown in FIG. 1a. The negative temperature coefficient component 40 can be electrically connected between the first electrode 32a and the voltage source, V, as shown in FIG. 1b, or between the voltage source, V, and the second electrode 32b, as shown in FIG. 1a. Although, for brevity, other embodiments are shown connected to either the first electrode 32a or to the second electrode 32b, both connections are within the scope of these teachings. In the embodiment shown in FIG. 1a, the negative temperature coefficient component 40 is a negative temperature coefficient thermistor, NTCT.

Figure 3:
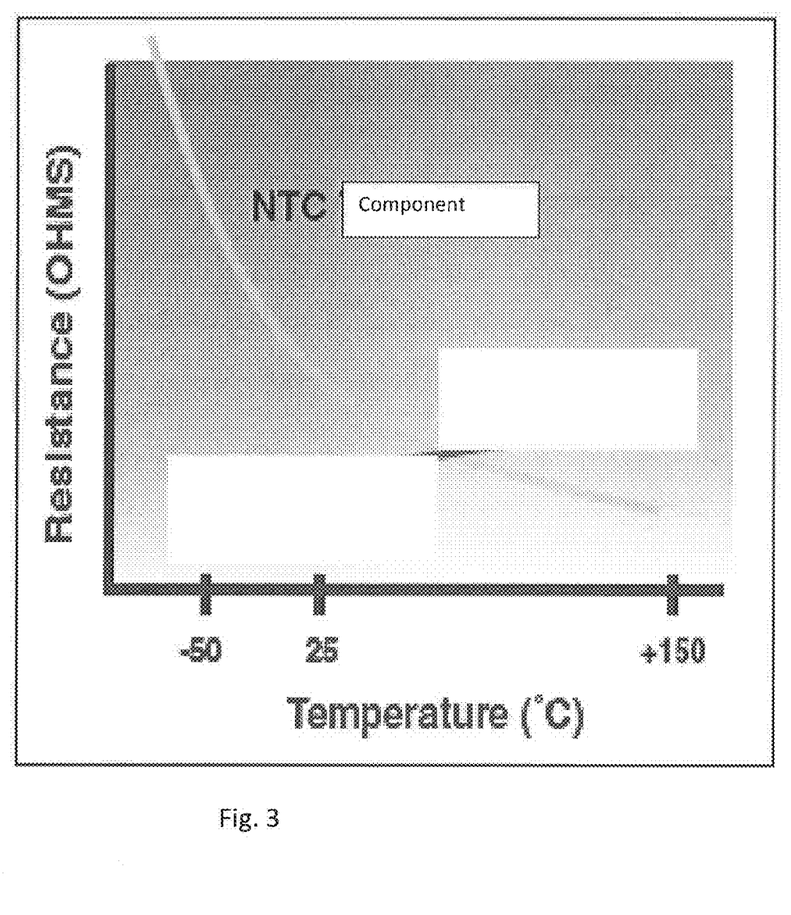
FIG. 3 graphically illustrates the variation of the resistance of the negative temperature coefficient component as used in these teachings as a function of temperature.

FIG. 2c shows the electrical current change, in an embodiment of the MEMS VOA of these teachings, after a step voltage input from the voltage source V, indicating that the resistance of the actuator increases during thermal equilibrium procedure with environment. Thus, with constant voltage applied from the voltage source V, the input power to the actuator decreases. FIG. 3 shows the variation of the resistance of the negative temperature coefficient component 40 as a function of temperature, in which the resistance decreases with temperature. This should be compared to the variation of the resistance of the MEMS VOA of these teachings with temperature, in which the resistance of the micro-actuator in the VOA of these teachings increases with temperature. Although, in one embodiment, the negative temperature coefficient component 40 can be selected to have, at room temperature, a resistance between about 2% to about 20% of the resistance at room temperature of the MEMS VOA of these teachings, the variation of the resistance of the negative temperature coefficient component 40 can be selected so that the variation of the resistance of the negative temperature coefficient component 40 with temperature compensates for a significant portion of the variation of the resistance of the MEMS VOA of these teachings with temperature. In one instance, the variation of the resistance of the negative temperature coefficient component 40 with temperature substantially compensates for the variation of the resistance of the MEMS VOA of these teachings with temperature.

Figure 4:
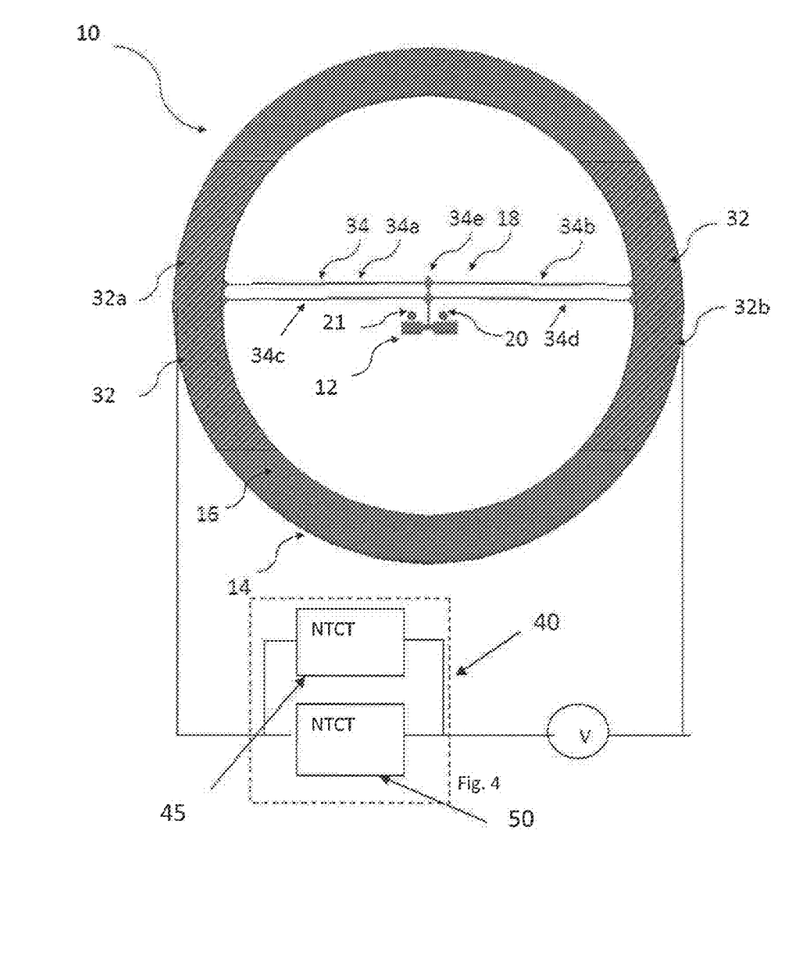
FIGS. 4-6 illustrate details of other embodiments of the MEMS VOA of these teachings.

Another embodiment of the negative temperature coefficient component 40 is used in the embodiment of the system shown in FIG. 4. Referring to FIG. 4, in the embodiment shown there in, the negative temperature coefficient component 40 includes a first negative temperature coefficient thermistor 45 electrically connected in parallel with a second negative temperature coefficient thermistor 50.

Figure 5:
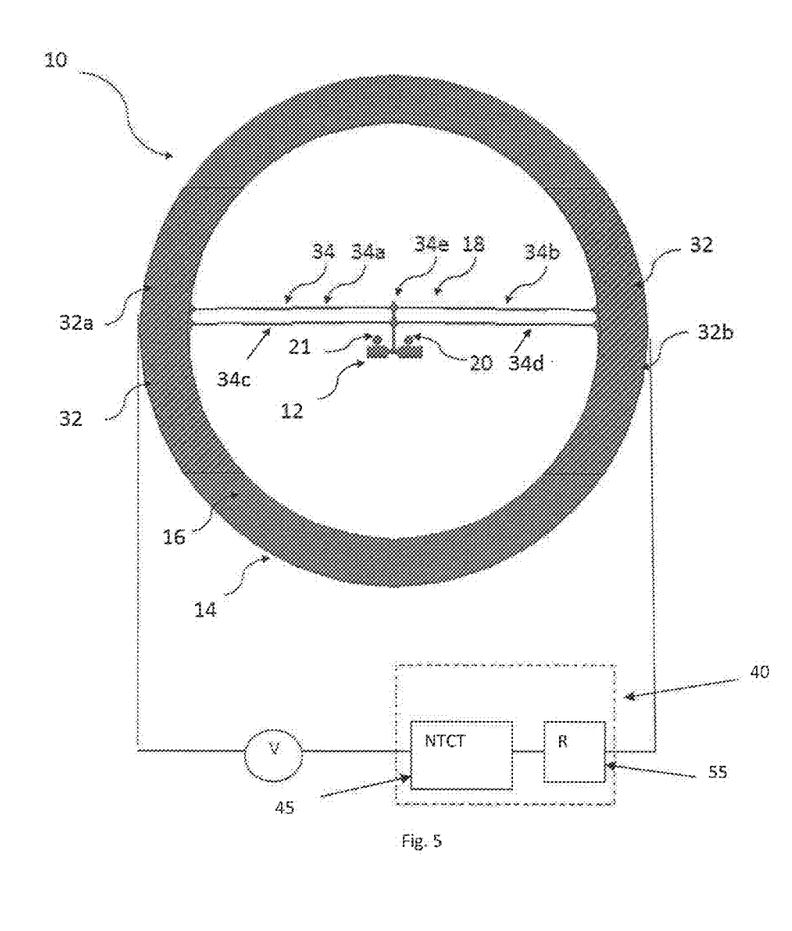

A further embodiment of the negative temperature coefficient component 40 is used in the embodiment of the system shown in FIG. 5. Referring to FIG. 5, in the embodiment shown there in, the negative temperature coefficient component 40 includes a negative temperature coefficient thermistor 45 electrically connected in series to a resistor 55.

Figure 6:
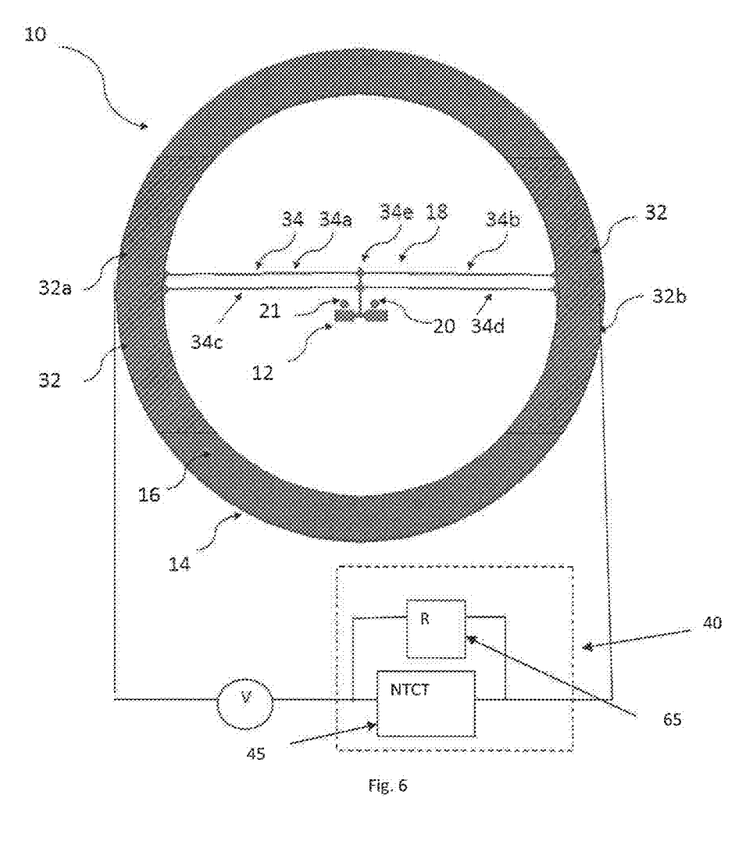

Yet another embodiment of the negative temperature coefficient component 40 is used in the embodiment of the system shown in FIG. 6. Referring to FIG. 6, in the embodiment shown there in, the negative temperature coefficient component 40 includes a negative temperature coefficient thermistor 45 electrically connected in parallel to a resistor 65.

Figure 7:
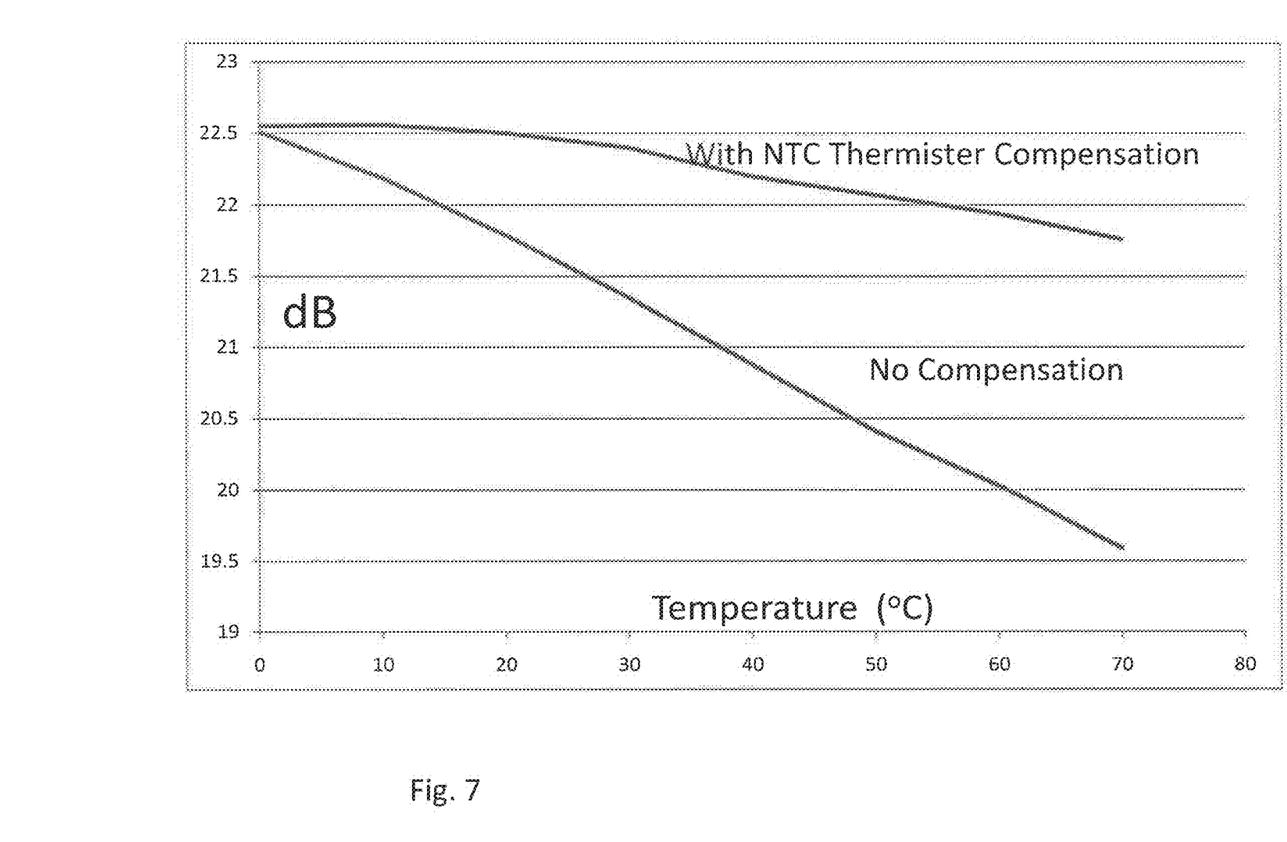
FIG. 7 graphically illustrates results of compensation of the variation of the resistance of the variable optical attenuator with temperature for one embodiment of the system of these teachings.

During use of the system of these teachings, a negative temperature coefficient component is electrically connected in series with one of a first electrode or a second electrode of the variable optical attenuator of these teachings. The negative temperature coefficient component is configured to be electrically connected in series with a voltage source, the voltage source configured to be electrically connected in series in order to complete an electrical circuit between the first electrode and the second electrode. In that manner, at least a portion of the variation of the resistance of the variable optical attenuator with temperature is thermally compensated when the voltage source is energized. FIG. 7 shows results of compensation of the variation of the resistance of the variable optical attenuator with temperature for one embodiment of the system of these teachings in which the negative temperature coefficient component is a negative temperature coefficient thermistor.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the teachings have been described with respect to various embodiments, it should be realized these teachings are also capable of a wide variety of further and other embodiments within the spirit and scope of the appended claims.

The invention claimed is:

1. A variable optical attenuator comprising:
an optical shutter;
a frame surrounding an area in which said optical shutter is disposed; said frame comprising a first electrode and a second electrode;
a first conductor having a first end fixedly attached to said first electrode; said first conductor being disposed at an angle from a line connecting said first electrode and said second electrode;
a second conductor having a first end fixedly attached to said second electrode; said second conductor being disposed at an angle from a line connecting said first electrode and said second electrode; said first conductor and said second conductor being the two sides of a triangle; a second end of said first conductor being connected to a second end of said second conductor; and
a negative temperature coefficient component configured to be electrically connected in series with a voltage source, the negative temperature coefficient component electrically connected in series with the voltage source constituting a circuit;
the circuit configured to be electrically connected between said first electrode and said second electrode;
said optical shutter being attached to said second end of said first conductor and said second end of said second conductor;

motion of said second end of the first conductor and said second end of the second conductor resulting in motion of said optical shutter; and said optical shutter being disposed over input/output optical ports.

2. The variable optical attenuator of claim 1 further comprising:

a third conductor having a first end fixedly attached to said first electrode; said third conductor being disposed at an angle from a line connecting said first electrode and said second electrode;

a fourth conductor having a first end fixedly attached to said second electrode; said fourth conductor being disposed at an angle from a line connecting said first electrode and said second electrode; said third conductor and said fourth conductor being the two sides of a triangle; a second end of said third conductor being connected to a second end of said fourth conductor; said third conductor and said fourth conductor being substantially parallel to said first conductor and said second conductor;

said optical shutter attached to said second end of said third conductor and said second end of said fourth conductor; said second end of said third conductor and said second end of said fourth conductor being movable.

3. The variable optical attenuator of claim 1 wherein a surface of said optical shutter disposed over the input/output optical ports has a reflecting layer disposed thereon.

4. The variable optical attenuator of claim 3 wherein said reflecting layer comprises at least one material selected from Ti, Cr, Au, Pt, or glass.

5. The variable optical attenuator of claim 3 wherein said optical shutter is disposed between an optical receiving port and an optical emitting port; and wherein said reflecting layer is disposed on a surface of said optical shutter facing the optical receiving port and on the surface of said optical shutter facing the optical emitting port.

6. The variable optical attenuator of claim 1 wherein a surface of said optical shutter disposed over the input/output optical ports has a refracting layer disposed thereon.

7. The variable optical attenuator of claim 6 wherein said refracting layer comprises at least one material selected from Ti, Cr, Au, Pt, or glass.

8. The variable optical attenuator of claim 6 wherein said optical shutter is disposed between an optical receiving port and an optical emitting port; and wherein said refracting layer is disposed on a surface of said optical shutter facing the optical receiving port and on the surface of said optical shutter facing the optical emitting port.

9. The variable optical attenuator of claim 1 wherein said first and second conductors are comprised of a material selected to substantially optimize a voltage across said first and second electrodes required for optical shutter displacement.

10. The variable optical attenuator of claim 9 wherein said material is doped silicon.

11. The variable optical attenuator of claim 1 wherein the negative temperature coefficient component comprises a negative temperature coefficient thermistor.

12. The variable optical attenuator of claim 1 wherein the negative temperature coefficient component comprises a resistor electrically connected in series with a negative temperature coefficient thermistor.

13. The variable optical attenuator of claim 1 wherein the negative temperature coefficient component comprises a first negative temperature coefficient thermistor electrically connected in parallel with a second negative temperature coefficient thermistor.

14. The variable optical attenuator of claim 1 wherein the negative temperature coefficient component comprises a resistor electrically connected in parallel with a negative temperature coefficient thermistor.

15. The method of claim 14 wherein the negative temperature coefficient component comprises a negative temperature coefficient thermistor.

16. The method of claim 14 wherein the negative temperature coefficient component comprises a negative temperature coefficient thermistor electrically connected in series to a resistor.

17. The method of claim 14 wherein the negative temperature coefficient component comprises a first negative temperature coefficient thermistor electrically connected in parallel to a second negative temperature coefficient thermistor.

18. The method of claim 14 wherein the negative temperature coefficient component comprises a negative temperature coefficient thermistor electrically connected in parallel to a resistor.

19. A method for thermal compensation of a variable optical attenuator, the method comprising the steps of:

electrically connecting a negative temperature coefficient component connected in series with one of a first electrode or a second electrode of the variable optical attenuator, the variable optical attenuator comprising:

an optical shutter; a frame surrounding an area in which the optical shutter is disposed; the frame comprising the first electrode and the second electrode; a first conductor having a first end fixedly attached to the first electrode; the first conductor being disposed at an angle from a line connecting the first electrode and the second electrode; a second conductor having a first end fixedly attached to the second electrode; the second conductor being disposed at an angle from a line connecting the first electrode and the second electrode; the first conductor and the second conductor being the two sides of a triangle; a second end of the first conductor being connected to a second end of the second conductor; the optical shutter being attached to the second end of the first conductor and the second end of the second conductor; motion of the second end of the first conductor and the second end of the second conductor resulting in motion of the optical shutter; the optical shutter being disposed over/between input/output, optical ports;

the negative temperature coefficient component being configured to be electrically connected in series with a voltage source, the voltage source configured to be electrically connected in series in order to complete an electrical circuit between the first electrode and the second electrode;

wherein at least a portion of the variation of resistance of the variable optical attenuator with temperature is thermally compensated when the voltage source is energized.

* * * * *